(12) United States Patent
Okuyama

(10) Patent No.: US 7,813,617 B2
(45) Date of Patent: Oct. 12, 2010

(54) DATA RECORDING/REPRODUCING APPARATUS AND METHOD

(75) Inventor: Tomoyuki Okuyama, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 1232 days.

(21) Appl. No.: 11/391,451

(22) Filed: Mar. 29, 2006

(65) Prior Publication Data

US 2006/0222343 A1 Oct. 5, 2006

(30) Foreign Application Priority Data

Apr. 4, 2005 (JP) ............... 2005-107339

(51) Int. Cl.
- H04N 5/91 (2006.01)
- H04N 7/00 (2006.01)
- H04N 5/93 (2006.01)
- H04N 7/26 (2006.01)
- H04N 5/00 (2006.01)
- G11B 27/00 (2006.01)

(52) U.S. Cl. .................. 386/46; 386/52; 386/124; 386/125; 386/126

(58) Field of Classification Search .......... 386/1, 386/46, 95, 124–126, 52–68, 82
See application file for complete search history.

(56) References Cited

U.S. PATENT DOCUMENTS

| | | | |
|---|---|---|---|
| 5,745,643 A | 4/1998 | Mishina | |
| 6,094,707 A | 7/2000 | Sokolov et al. | |
| 6,279,076 B1 | 8/2001 | Shishido et al. | |
| 6,778,265 B1 | 8/2004 | Lin et al. | |
| 2002/0159758 A1 * | 10/2002 | Okuyama et al. | ............. 386/95 |
| 2003/0223737 A1 | 12/2003 | Shibutani | |
| 2004/0131332 A1 * | 7/2004 | Wilson et al. | ................. 386/68 |

FOREIGN PATENT DOCUMENTS

| | | |
|---|---|---|
| CN | 1293815 A | 5/2001 |
| EP | 1 255 250 A1 | 11/2002 |
| JP | 2002-56609 A | 2/2002 |
| WO | 01/46792 A1 | 6/2001 |

* cited by examiner

Primary Examiner—Marsha D Banks Harold
Assistant Examiner—Marc Dazenski
(74) Attorney, Agent, or Firm—Sughrue Mion, PLLC

(57) ABSTRACT

A data recording/reproducing apparatus according to an embodiment of the present invention includes: a temporary storage unit for storing a data stream including a plurality of data units, which is divided into M (M is a natural number) segments that stores the plurality of data units; a control unit for detecting that K (K is a natural number) data units related to the order of reproducing or recording data of a first data unit, after the first data unit included in the data stream is stored in the temporary storage unit, and setting relational information for the K data units in the first data unit; and a recording/reproducing unit that receives a data stream including the set first data unit from the temporary storage unit on a segment basis, and references the received data stream to generate recording data to record the data on a recording medium, and/or reads the recorded data from the recording medium to reproduce the read data.

14 Claims, 8 Drawing Sheets

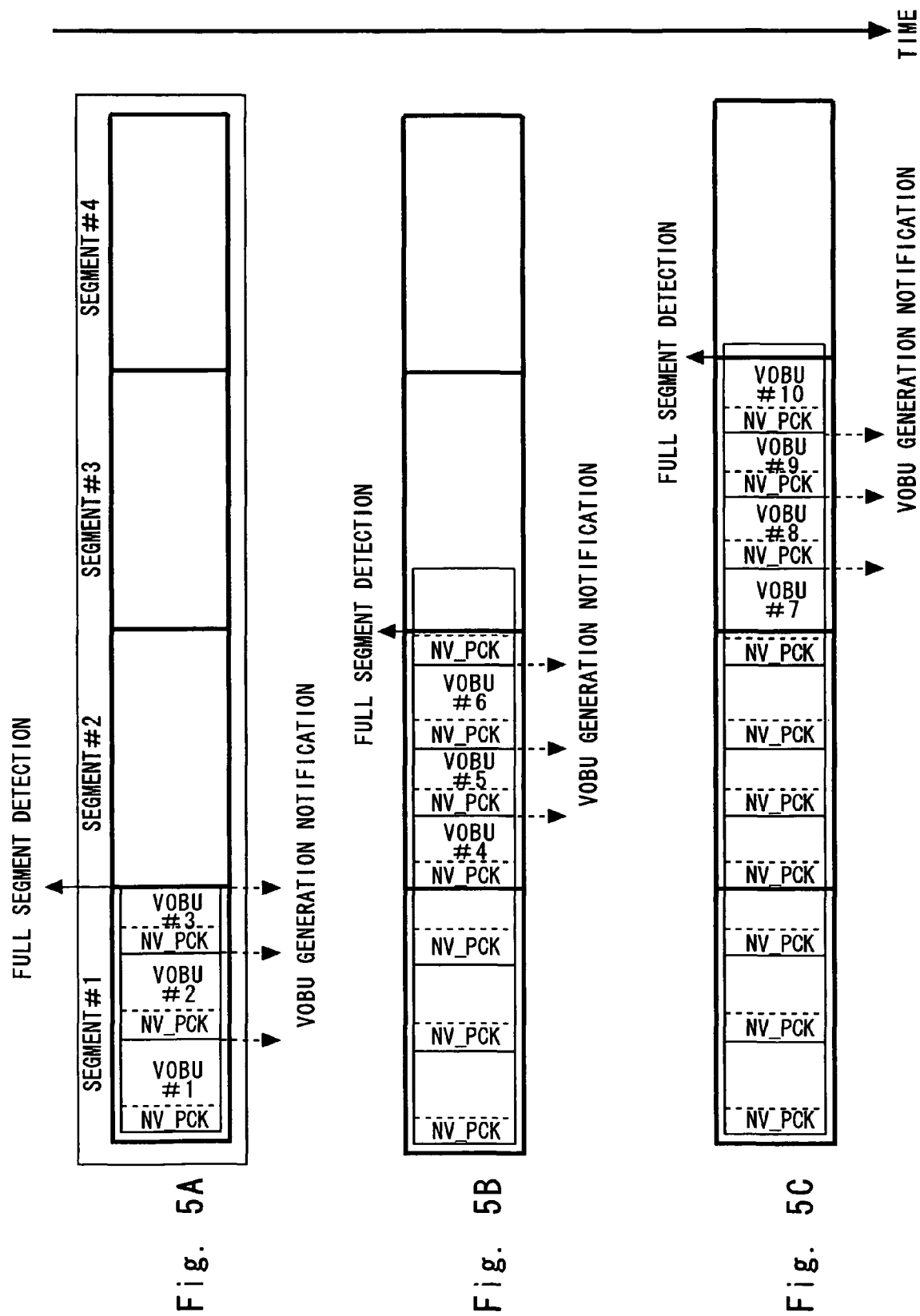

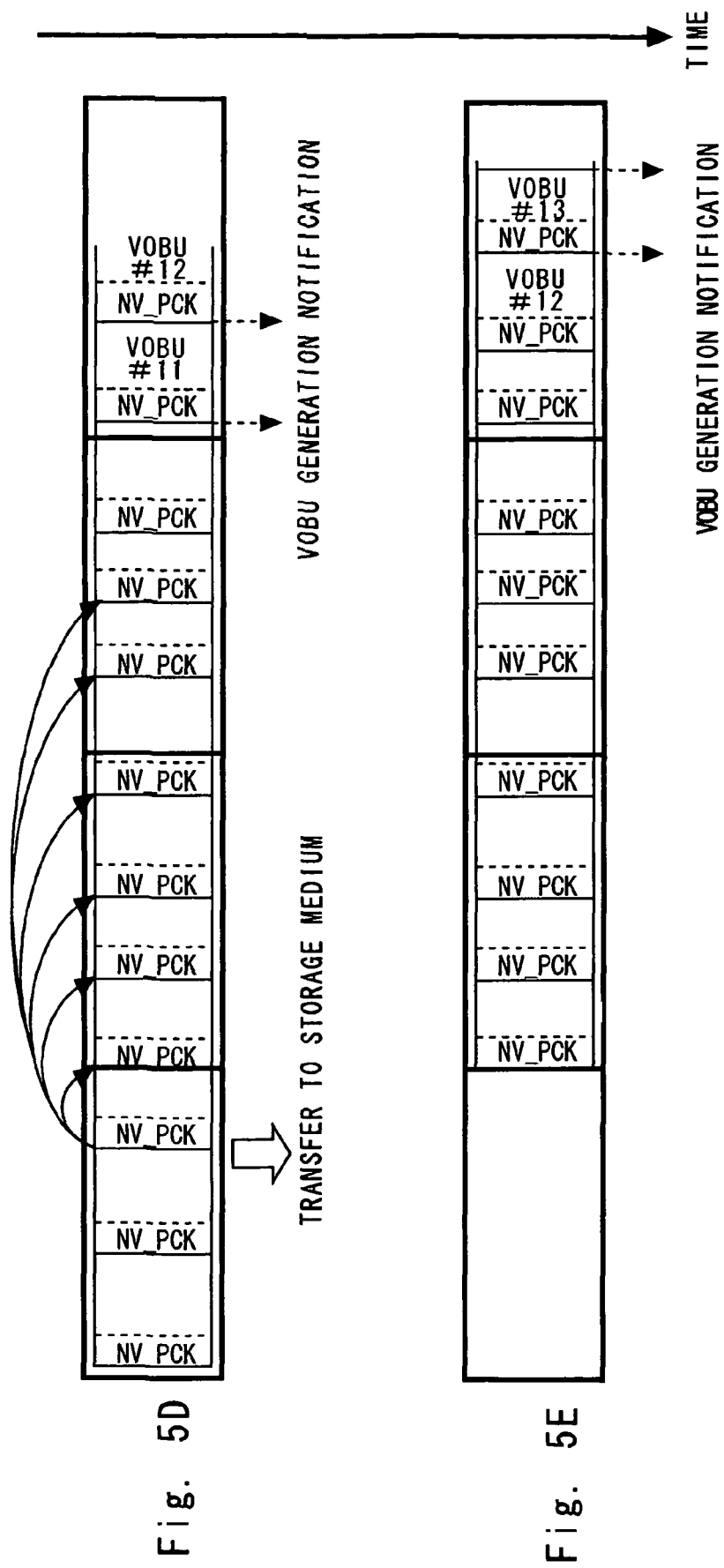

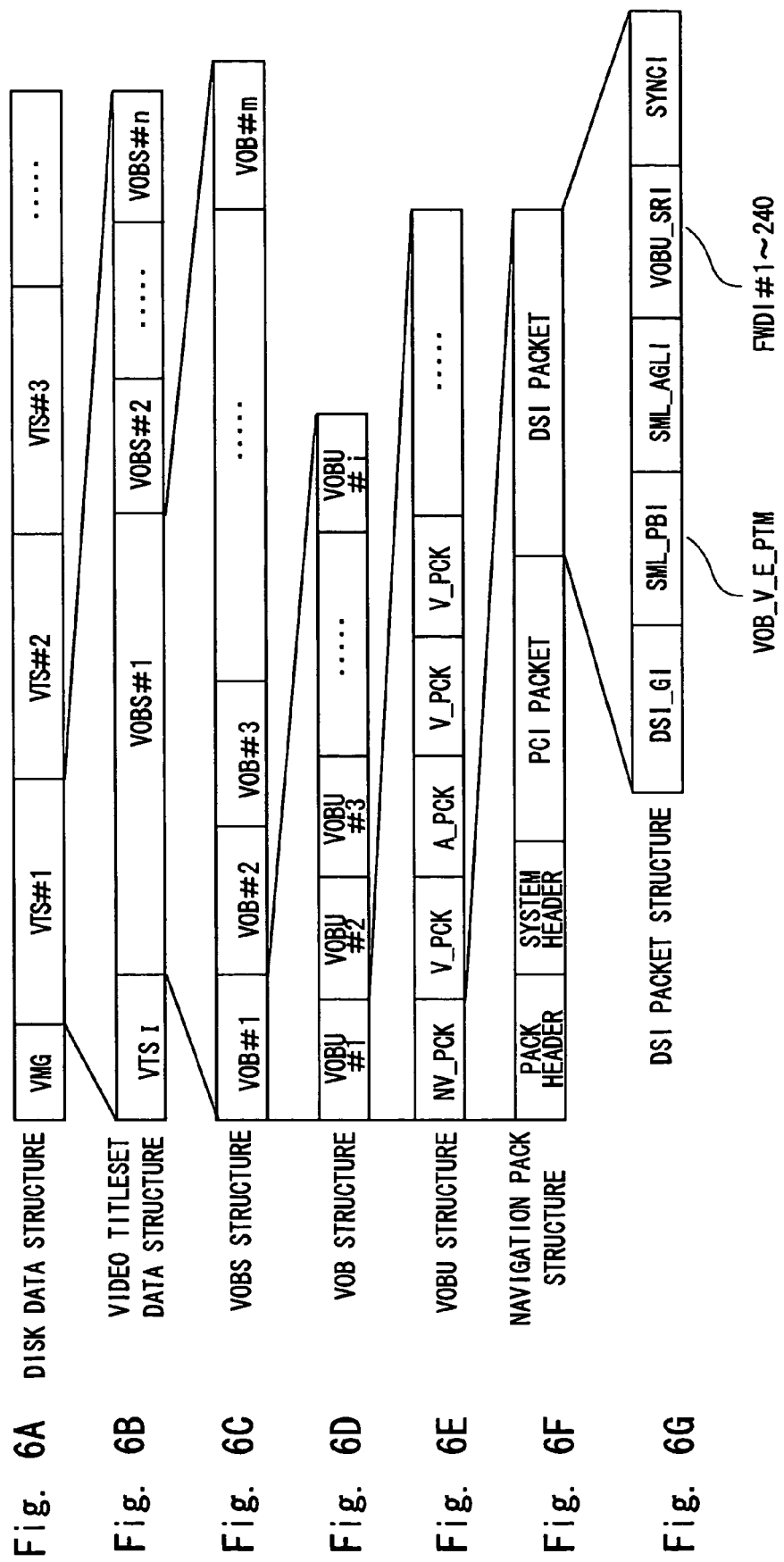

DATA RECORDING/REPRODUCING APPARATUS AND METHOD

BACKGROUND OF THE INVENTION

1. Field of the Invention

The present invention relates to a data recording/reproducing apparatus and method. In particular, the invention relates to a data recording/reproducing apparatus and method for recording/reproducing data using a recording medium such as a DVD (Digital Versatile Disk).

2. Description of Related Art

In recent years, DVDs have been stabilized and come into widespread use. As a standard for recording a video signal or an audio signal on a recording medium such as a DVD (DVD-R, DVD-RW, or DVD-RAM), DVD-Video or DVD+VR (DVD+ReWritable Video format) has been known. The DVD-Video data format is compatible with that the DVD+VR data format. In the following description, the term "DVD-Video standard" refers to not only the DVD-Video and the DVD+VR but also other standards compatible with these in terms of data format.

According to the DVD-Video standards, digital video data or audio data (data stream) which is compression-encoded based on the MPEG2 (Moving Picture Expert Group 2) encoding system is recorded on a DVD.

FIGS. 6A to 6G show a data structure based on the DVD-Video standards. As shown in FIGS. 6A to 6B, data conforming to the DVD-Video standards has a hierarchical structure, and FIG. 6A shows a data structure in the top layer of the hierarchical structure. As shown in FIG. 6A, VMG (Video Manager) is recorded at the head thereof. Following this, up to 99 VTSs (Video Title Sets) are recorded.

As shown in FIG. 6B, VTSI (Video Title Set Information) including control information about a title is recorded at the head of each VTS. Following the VTSI, n VOBSs (Video Object Sets) are recorded.

As shown in FIG. 6C, each VOBS is composed of m VOBs (Video Objects). As shown in FIG. 6D, each VOB is composed of i VOBUs (Video Object Units). Incidentally, according to the DVD-Video standards, the VOB is composed of one or more cells each including n VOBUs.

Here, the DVD-Video and DVD+VR standards specify the maximum number of cells in one VTS as 255. As for the DVD+VR standards, one VOB includes one cell, and one VTS includes up to 255 VOBs. As for the DVD-Video standards, one VOB includes at least one cell, so one VTS includes up to 255 VOBs as well. The number of VOBUs in one VOB varies depending on a bit rate or the number of video frames. The bit rate refers to a data amount of video or audio data per second. The higher bit rate leads to high-quality image and sound.

As shown in FIG. 6E, each VOBU is composed of plural packs, and each pack size is 2,048 bytes. The VOBU includes NV_PCK (Navigation Pack), V_PCK (Video Pack), and A_PCK (Audio Pack) The VOBU may other data such as SP_PCK (Sub Picture Pack). As shown in FIG. 6E, NV_PCK is arranged only at the head of each VOBU. Following the NV_PCK, an arbitrary number of packs such as V_PCK, A_PCK, or SP_PCK are arranged as needed.

In the A_PCK, compression-encoded audio data is recorded, and in the V_PCK, compression-encoded video data is recorded. In the NV_PCK, control information for controlling data in the VOBU such as data about normal reproduction or special reproduction (slow reproduction, high-speed reproduction, and skip reproduction) is recorded. As shown in FIG. 6F, the NV_PCK is composed of a pack header, a system header, DSI packets as retrieval information for retrieving a moving picture or sound to be reproduced/displayed, and PCI packets as display control information for controlling the moving picture or sound retrieved using the DSI packets. As shown in FIG. 6G, the DSI packets include DSI_GI (DSI general information), SML_PBI (seamless reproduction information), SML_AGLI (seamless angle information), VOBU_SRI (VOBU search information), and SYNCI (synchronous information). The SML_PBI includes a reproduction ending time VOB_V_E_PTM, and the VOBU_SRI includes a forward pointer FWDI. In the reproduction ending time VOB_V_E_PTM, every possible ending time of reproduction of all VOBs including the VOBU is recorded. The forward pointer FWDI is forward information, in other words, a pointer for specifying a header address of the VOBU in the VOB, which will be reproduced. In the forward pointer FWDI, header addresses of the second to $241^{st}$ VOBUs from the viewpoint of a target VOBU (FWDI 1, 2, 3, 4, 5, 6, 7, 8, 9, 10, 11, 12, 13, 14, 15, 20, 60, 120, 240) can be recorded.

As mentioned above, data conforming to the DVD-Video standards includes future data such as reproduction ending time VOB_V_E_PTM or forward pointer FWDI. As a result, according to a conventional data recording apparatus, in general, in the case of generating a data stream (video data or audio data, the data stream is temporarily stored in a stream buffer. When the reproduction ending time VOB_V_E_PTM and the forward pointer FWDI are decided, those data are set and recorded on the DVD.

FIG. 7 shows an example of a stream buffer 700 used in the conventional data recording apparatus. The conventional stream buffer 700 sequentially stores data streams generated with an encoder etc. In this example, VOBUs constituting the data stream are stored in order from VOBU#1.

For setting the reproduction ending time VOB_V_E_PTM, the reproduction ending time of the final video frame of the VOB is necessary. Thus, assuming that the VOB is composed of n VOBUs, after the stream buffer 700 stores n VOBUs, the reproduction ending time VOB_V_E_PTM can be set. Accordingly, the stream buffer 700 requires a capacity enough to store all of one VOB.

Further, for setting the forward pointer FWDI, in addition to the setting-target VOBU, VOBUs as many as the forward pointer FWDIs need to be stored in the stream buffer 700. Thus, in the case of setting the forward pointer FWDIs 1 to 240, the stream buffer 700 requires a capacity enough to store 240 or more VOBUs.

Incidentally, as the conventional data recording apparatus, an apparatus as disclosed in Japanese Unexamined Patent Publication No. 2002-56609 has been known. In the apparatus disclosed in Japanese Unexamined Patent Publication No. 2002-56609, the number of VOBUs in the VOB is kept constant, and NV_PCK is previously set based on the number of VOBUs.

As mentioned above, in the conventional data recording apparatus, for setting the reproduction ending time VOB_V_E_PTM or the forward pointer FWDI, the stream buffer should store all VOBUs in one VOB. For example, in the case of recording 255 VOBs on a single DVD, an average size per VOB is about 17 megabytes (=4.2 gigabytes/255), so the stream buffer needs to have a capacity not less than 17 megabytes.

As a result, the conventional data recording apparatus has a problem in that a memory size of the stream buffer is large, and cost reduction of the data recording apparatus is difficult.

SUMMARY OF THE INVENTION

A data recording/reproducing apparatus according to an aspect of the present invention includes: a temporary storage unit for storing a data stream including a plurality of data units, which is divided into M (M is a natural number) segments that stores the plurality of data units; a control unit for detecting that K (K is a natural number) data units related to the order of reproducing or recording data of a first data unit, after the first data unit included in the data stream is stored in the temporary storage unit, and setting relational information for the K data units in the first data unit; and a recording/reproducing unit that receives the data stream including the set first data unit from the temporary storage unit on a segment basis, and references the received data stream to generate recording data to record the data on a recording medium, and/or reads the recorded data from the recording medium to reproduce the read data.

According to the data recording/reproducing apparatus, the temporary storage unit is divided into segments, and necessary data is compensated for can output on a segment basis. Then, the temporary storage unit needs only to have a capacity enough to store data units necessary for compensating for data in one or more segments. Hence, it is possible to save a capacity of the temporary storage unit, and reduce an apparatus cost.

According to another aspect of the invention, a data recording/reproducing method for recording or reproducing a data stream in a plurality of data units to be input, includes: storing a data stream including a plurality of data units to a temporary storage unit that is divided into M (M is a natural number) segments that stores the plurality of data units; detecting that K (K is a natural number) data units related to the order of reproducing or recording data of a first data unit, after the first data unit included in the data stream is stored in the temporary storage unit; setting relational information for the K data units in the first data unit; and receiving the data stream including the set first data unit from the temporary storage unit on a segment basis, and referencing the received data stream to generate recording data to record the data on a recording medium, and/or reading the recorded data from the recording medium to reproduce the read data.

According to the data recording/reproducing method, the temporary storage unit is divided into segments, and necessary data is compensated for can output on a segment basis. Then, the temporary storage unit needs only to have a capacity enough to store data units necessary for compensating for data in one or more segments. Hence, it is possible to save a capacity of the temporary storage unit, and reduce an apparatus cost.

According to the present invention, it is possible to provide a data recording/reproducing apparatus, method, and program capable of saving a memory size of a stream buffer and saving an apparatus cost.

BRIEF DESCRIPTION OF THE DRAWINGS

The above and other objects, advantages and features of the present invention will be more apparent from the following description taken in conjunction with the accompanying drawings, in which:

FIGS. 5A to 5E illustrate an operation of the data recording apparatus according to the embodiment of the present invention;

FIGS. 6A to 6G show the structure of data conforming to DVD-Video standards.

DESCRIPTION OF THE PREFERRED EMBODIMENTS

Figure 1:
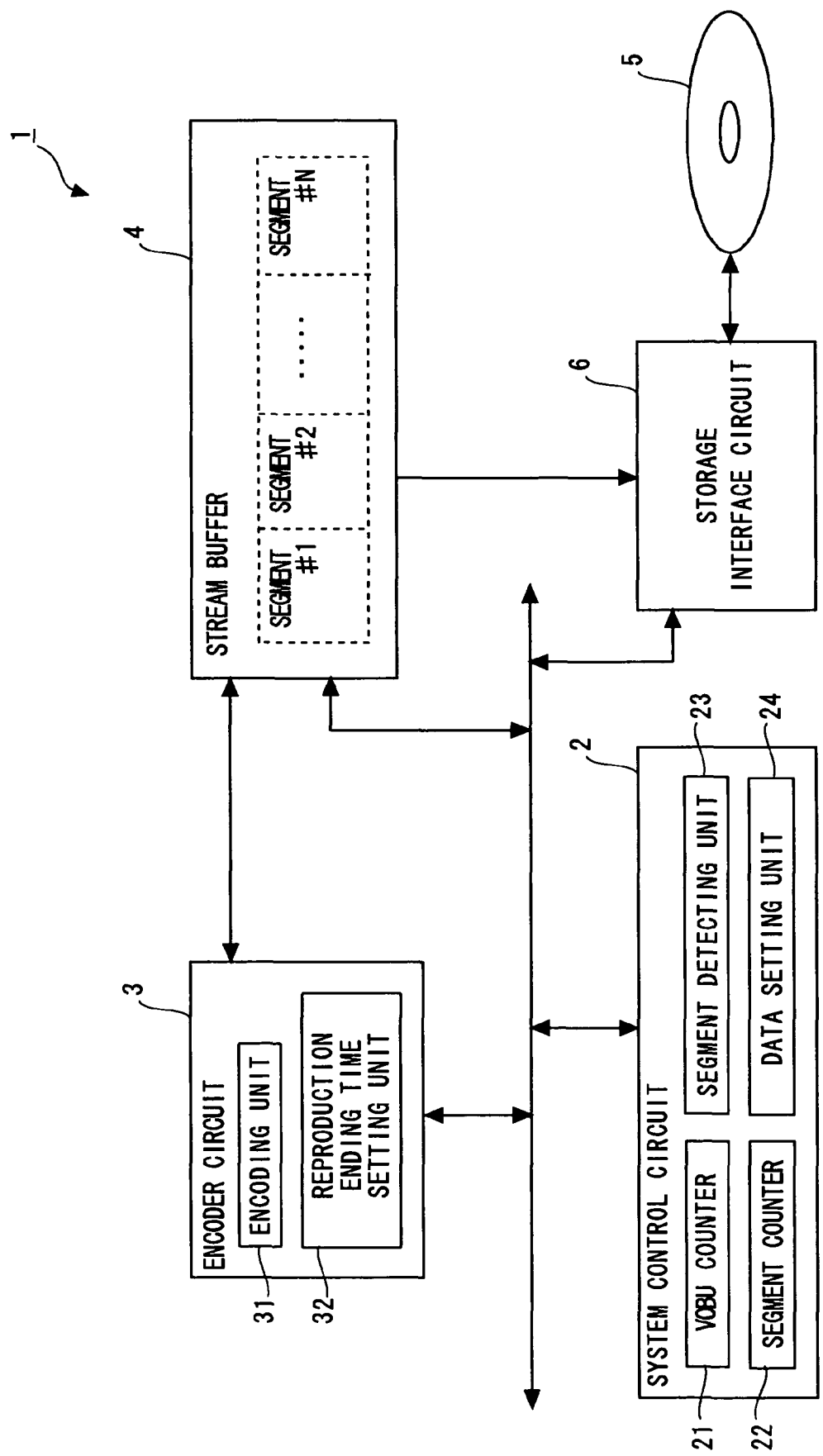
FIG. 1 is a block diagram showing the configuration of a data recording apparatus according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A data recording/reproducing apparatus according to the present invention records or reproduces a data stream including plural data units to be input. The data recording/reproducing apparatus has a temporary storage unit, a control unit, and a recording/reproducing unit. The temporary storage unit is a stream buffer or the like, which stores data streams including data units such as VOBUs. Further, the temporary storage unit is divided into M (M is natural number) segments for storing plural data units. The control unit is a system control circuit or the like. After a first data unit in a data stream is stored in the temporary storage unit, for setting the forward pointer FWDI or the like, it is detected that K (K is a natural number) data units related to the order of reproducing and recording VOBUs are stored in the first data unit. Then, the control unit sets relational information such as a header address of the K data units in the first data unit. The recording/reproducing unit is a storage interface circuit. The data stream including the first data unit where the relational information is set is input from the temporary storage unit on a segment basis. Then, the recording/reproducing unit references the input data stream to record recording data on a recording medium, and/or reads the recorded data from the recording medium to reproduce the read data.

Further, the data recording/reproducing method of the present invention records or reproduces the data stream including plural data units to be input. The data recording/reproducing method stores the data stream, sets data in the data stream, and records the data stream on a recording medium or reproduces the data. The data streams are stored in the temporary storage unit of the stream buffer. The temporary storage unit is divided into M (M is a natural number) segments for storing plural data units such as VOBU. As regards setting of data in the data stream, after the first data unit in the data stream is stored in the temporary storage unit, for setting the forward pointer FWDI, it is detected that the K (K is a natural number) data units related to the order of reproducing or recording VOBUs are stored. Then, relational information such as a header address of the K data units is set in the first data unit. The data stream including the first data unit where the relational information is set is input from the temporary storage unit on a segment basis at the time of recording data on a recording medium. Then, the input data streams are referenced to record the generated recording data on the recording medium, and/or read the recorded data from the recording medium to reproduce the read data.

First Embodiment

First, a data recording apparatus according to a first embodiment of the present invention is described. A feature of the data recording apparatus according to this embodiment is that a stream buffer divided into plural segments is provided, and one or more segments store VOBUs necessary for compensating for data of 1 VOBU.

FIG. 1 shows the configuration of the data recording apparatus according to this embodiment. A data recording apparatus 1 of this embodiment generates a data stream conforming to the DVD-Video standards, and records the data stream on a recording medium. As shown in FIG. 1, the data recording apparatus 1 includes a system control circuit 2, an encoder circuit 3, a stream buffer 4, a recording medium 5, and a storage interface circuit 6. For example, the system control circuit 2, the encoder circuit 3, the stream buffer 4, and the storage interface circuit 6 are connected with one another via a bus and can exchange data from one another. Further, the system control circuit 2, the encoder circuit 3, the stream buffer 4, and the storage interface circuit 6 may be different semiconductor devices, or may be incorporated into one semiconductor device.

The encoder circuit 3 executes compression-encoding on an input signal based on an MPEG2 encoding system to generate a data stream. The generated data stream has the data structure as shown in FIGS. 6A to 6G, and includes a VOB composed of consecutive VOBUs. The VOBU is an example of a data unit constituting the data stream. The data stream has a hierarchical structure, and an upper-layer data block composed of VOBU is the VOB. In this embodiment, the encoder circuit 3 outputs the VOBU where portions other than the forward pointer FWDI of NV_PCK are set.

Further, the encoder circuit 3 includes an encoding unit 31, and a reproduction ending time setting unit 32. The encoding unit 31 executes compression-encoding and generation of VOBU. The encoding unit 31 compression-encodes video signals input from a camera, for example, based on the MPEG2 encoding system to generate V_PCK, and compression-encodes audio signals input with a microphone based on the MPEG2 or MPEG3 encoding system to generate A_PCK. Then, the encoding unit 31 generates a VOBU including V_PCK and A_PCK with the NV_PCK at the head.

At this time, the encoding unit 31 notifies the system control circuit 2 of the generation of the VOBU each time the VOBU is generated. The VOBU generation notification suggests that the encoding unit 31 has generated one VOBU, and that one VOBU has been stored in the stream buffer 4. For example, the VOBU generation is notified, and also, the number of packs in the VOBU is notified. Besides, the encoding unit 31 notifies the system control circuit 2 of the completion of the VOB generation upon the completion of the generation of the VOB (when the number of VOBUs becomes equivalent to 1 VOB), and notifies the system control circuit 2 of the completion of stream generation upon the completion of generation of all data streams.

Here, in this embodiment, the number of VOBUs in one VOB is assumed to be fixed. In a searching operation such as fast-forward or reverse at the time of reproduction after recording the data streams, the number of VOBUs per VOB (cell) in one reproduction, that is, 1 VTS is preferably fixed. In the searching operation during the reproduction, video data (I picture) at the head of each VOBU is searched to decode and display only the video data at the head. Hence, if the number of VOBUs in one VOB is fixed, during the searching operation, the reproduction time for all video data can be kept constant. Accordingly, during the searching operation, the entirely uniform video data can be reproduced, and smoothly displayed. The number of VOBUs in one VOB is determined based on an encoding-target bit rate (video bit rate and audio bit rate) and the number of video frames N (frame rate) in each VOBU. The bit rate is preset to a predetermined value in accordance with a recording time, an image quality, and a sound quality of an image and sound recorded on a recording medium.

The DVD-Video standards define the maximum number of VOBs in one VTS as 255 as mentioned above. Accordingly, the number of VOBUs in one VOB in one VTS is derived from Expression 1 below.

$$\text{The number of VOBUs per VOB} = \text{recording time} / ((255-R)*(\text{recording time per VOBU})) \quad \text{Expression 1}$$

In Expression 1, R represents an allowable value for satisfying a relation between the number of VOBUs per VOB and the reproduction time. The value of R is determined based on the reproduction time (each reproduction time mode), on the assumption that the number of VOBUs in each VOB is fixed as mentioned above. For example, if one VTS is composed of 240 VOBs, it is easy to determine a search speed ratio in each recording time mode. In each recording time mode, if the number of VOBUs in one VOB is fixed, reproduction is effected at n-fold speeds, and the search time (search speed) for searching all of one VTS becomes uniform. Accordingly, R is an allowable value for setting the number of VOBUs in one VOB constant.

Further, R is set to 15, for example, in consideration of a possibility that sufficient recording time cannot be ensured when the number of VOBUs in one VOB is smaller than 240 due to a change in bit rate. That is, data should be recorded on a recording medium 5 within a desired recording time, so R is an allowable value that ensures the sufficient total recording time for recording VTS on the recording medium 5 in the case of recording VBR (Variable Bit Rate).

Here, provided that the number of VOBs in one VTS is 240 (255−15), and a reproduction time per VOB is 29.97, the number of VOBUs per VOB is as shown in Table 1 below. Incidentally, in Table 1, the reproduction time per VOBU is such that 15 frames*1/29.97 (NTSC system)=0.5005 second.

TABLE 1

| Recording time (time) | Allowable value R | The number of VOBUs per VOB |
|---|---|---|
| 10 | 15 | 300 |
| 8 | 15 | 240 |
| 6 | 15 | 180 |
| 4 | 15 | 120 |
| 2 | 15 | 60 |
| 1 | 15 | 50 |

For example, the encoding unit 31 includes a counter for counting the number of generated VOBUs. When the count value reaches the number of VOBUs in Expression 1, it is determined that one VOB is generated, and the system control circuit 2 is notified of the completion of the VOB generation.

The reproduction ending time setting unit 32 is an end data setting unit for setting reproduction ending time VOB_V_E_PTM for the NV_PCK of the VOBU generated with the encoding unit 31. The reproduction ending time VOB_V_E_PTM is the ending time at which the reproduction of the VOB including the VOBU is completed as mentioned above, and the end data arranged at the end of the VOB and related to the VOBU. The reproduction ending time of the VOB is determined based on the number of VOBUs in the VOB and the reproduction time per VOBU. The number of VOBUs reproduced till the current time is subtracted from the number of VOBUs in one VOB derived by Expression 1 above to derive the number of unreproduced VOBUs, and the reproduction ending time is determined by (the number of unreproduced VOBUs×reproduction time for one VOBU). After setting the reproduction ending time, the VOBU is output to the stream buffer 4. The reproduction ending time setting unit 32 previously sets the reproduction ending time VOB_V_E_PTM in each VOBU before the last VOBU in the VOB is stored in the stream buffer 4.

The stream buffer 4 is a temporary storage unit for temporarily storing the data stream generated with the encoder circuit 3. In this embodiment, the stream buffer 4 is divided into M segments. The data stream is transferred to the storage interface circuit 6 on the segment basis and recorded on the recording medium 5. However, the segment size is almost equivalent to a wiring unit to the recording medium 5 with the storage interface circuit 6.

Further, the segment size is set to store plural VOBUs as mentioned below and is integral multiple of each pack in the VOBU, that is, integral multiple of 2,048 bytes.

Incidentally, the data is written to/read from the stream buffer 4, for example, under the control of the system control circuit 2. This is not limited thereto. A buffer control unit may be provided in the stream buffer 4, and the buffer control unit may write/read data.

The system control circuit 2 controls various operations of the data recording apparatus 1. After the stream buffer 4 stores the first VOBU, the system control circuit 2 detects that K VOBUs related to the order of reproducing or recording VOBUs are stored, and sets positional information (relational information) as the header address of the K VOBUs in the first VOBU. The system control circuit 2 is composed of, for example, a memory or CPU, and executes various kinds of processing based on a program previously stored in a memory.

As shown in FIG. 1, the system control circuit 2 includes a VOBU counter 21, a segment counter 22, a segment detecting unit 23, and a data setting unit 24. For example, programs that describe processings of the VOBU counter 21, the segment counter 22, the segment detecting unit 23, and the data setting unit 24 are stored in a memory, and executed on a memory. The CPU executes a processing based on the program, and controls the data recording apparatus of FIG. 1 in cooperation with other hardware components.

The VOBU counter 21 counts the number of VOBU generation notifications from the encoder circuit 3, that is, the number of VOBUs. Based on the count value of the VOBU counter 21, it is judged whether or not the VOBU necessary for setting the forward pointer FWDI is stored in the stream buffer 4. That is, the VOBU counter 21 is a data unit detecting unit for updating the count value each time the VOBU is stored in the stream buffer 4, and detecting the number of stored VOBU based on the count value.

The segment detecting unit 23 monitors a segment memory occupancy in the stream buffer 4. Further, when the data is throughout stored from the head to the end of one segment, the segment detecting unit 23 detects it as full segment. For example, when an amount of data stored in the segment reaches a segment size, the segment detecting unit 23 determines it as full segment. Incidentally, the full segment is detected by the system control circuit 2 monitoring the number in this example. However, the present invention is not limited thereto, and the full segment may be detected inside the stream buffer 4, and the system control circuit 2 may be notified of the detection.

The segment counter 22 latches the count value of full segments detected by the segment detecting unit 23. Based on the count value latched by the segment counter 22, it is judged whether or not the VOBU necessary for setting the forward pointer FWDI is stored in a given segment.

The data setting unit 24 sets data necessary for outputting to the storage interface circuit 6, for the data stream stored in the stream buffer 4. The data setting unit 24 sets the forward pointer FWDI for the NV_PCK of the VOBU stored in each segment of the stream buffer 4. The forward pointer FWDI is, as mentioned above, the header address of a VOBU to be reproduced later, and positional information related to the order of reproducing the VOBUs. After setting the forward pointer FWDI in the VOBU of the segment, the data stream of the segment is transferred to the storage interface circuit 6.

The recording medium 5 is a DVD such as a DVD-R, a DVD-RW, or a DVD-RAM. The recording medium 5 needs only to record only data conforming to the DVD-Video standards, so the recording medium may be a hard disk.

The storage interface circuit 6 receives a data stream from the stream buffer 4, and writes the data stream to the recording medium 5. The storage interface circuit 6 is a recording/reproducing unit for inputting the data stream including the VOBU from the stream buffer 4 on the segment basis, and recording data generated with reference to the input data stream to record the data stream on a recording medium, and/or read the recorded data from the recording medium to reproduce the read data. The storage interface circuit 6 records or reproduces the data stream on the basis of segment of the stream buffer 4. For example, the storage interface circuit 6 includes an optical head or a spindle motor (not shown). The spindle motor is used to rotate the recording medium 5, and laser light is applied to a predetermined position of the recording medium 5 using the optical head to record the data stream.

Figure 2:
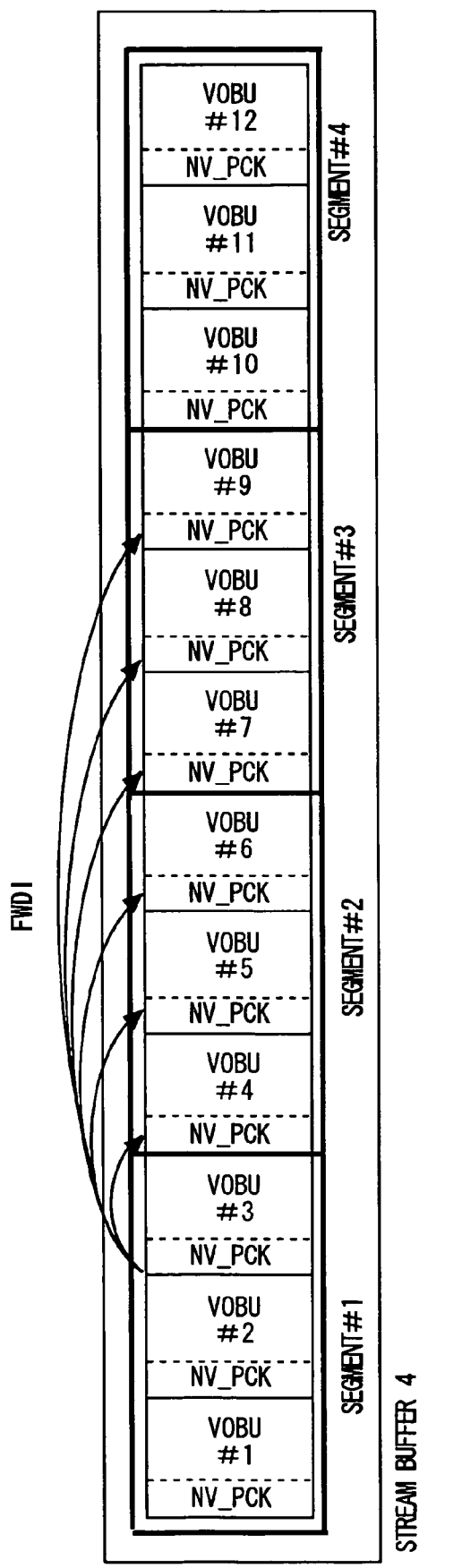
FIG. 2 shows the structure of a stream buffer of the data recording apparatus according to the embodiment of the present invention.

FIG. 2 shows the structure of a stream buffer according to this embodiment. In this example, the stream buffer 4 is composed of four segments. The VOBU generated by the encoder circuit 3 is stored in order to the segments #1 to #4. Each segment includes plural VOBUs. In the illustrated example, for ease of explanation, each segment includes three VOBUs.

The stream buffer 4 has a ring-buffer structure, and the VOBU is rewritten and stored following the segment #4, from the segment #1. After the data stream is stored in order from the segments #1 to #4, the stream buffer 4 outputs a data stream stored in the segment #1, and the new data stream is used to update the data stream stored in the segment #1. The segment #1 where the data streams are sequentially output is updated to the new data stream. In this embodiment, the data stream is transferred and recorded to the storage interface circuit 6 on the segment basis, so in order to smoothly record the VOBU generated by the encoder circuit 3 on the recording medium 5 with no delay, it is necessary to output a data stream of the segment to the storage interface circuit 6 before the segment is reused to store the new VOBU, that is, during the storage of another segment.

Then, for transferring the data stream of the segment, it is necessary to compensate for the forward pointer FWDI for the NV_PCK of all VOBUs in the segment. In this example, the number of forward pointer FWDIs set for the NV_PCK is set to 6. Thus, the header addresses of each of the VOBUs #4 to #9 of the segments #2 and #3 are set for the forward pointer FWDIs #1 to #6 of the VOBU_SRI in the NV_PCK of the VOBU#3 at the end of the segment #1. At this time, the header address of the VOBU#4 is set for the forward pointer FWDI#1. Next, the VOBU#5 is set for the forward pointer FWDI#2, and VOBU is set for up to the forward pointer FWDI#6.

That is, conditions for recording the next VOBU for the segment #1 are that VOBUs as many as the forward pointer FWDIs for each NV_PCK of the segment #1 are stored in segments other than the segment #1. In this example, six or more VOBUs designated by each NV_PCK of the segment #1 are stored in the segments #2 and #3. The same applies to the segments #2, #3, and #4.

Accordingly, provided that the number of forward pointer FWDIs for the NV_PCK is set to K (the number of compensated FWDIs), and the segments (the number of segments is total segment number−2) include VOBUs not less than the number K of compensated FWDIs, or NV_PCKs not less than the number K of compensated FWDIs all the time, it is possible to compensate for each NV_PCK of the segment and output the data to the storage interface circuit 6, so the stream buffer is never collapsed. If (total segment number−2) is represented by (total segment number M−A), the following expression is satisfied.

(Total segment number $M-A$)×(stream buffer capacity/total segment number $M$)/$K \geq$ encoding amount per VOBU (bit amount)  Expression 2

Provided that the reference number=(total segment number M−A), Expression 2 can be expressed as the reference number×(stream buffer capacity/total segment number M)/K. In Expression 2, (total segment number M−A) is the number of segments necessary for ensuring VOBUs as many as the number K of compensated FWDIs. Here, A represents a reference segment number, and the reference segment number A is an integer of 1 or more ($A \geq 1$ and the total segment number M−A>0). The encoding amount per VOBU is determined based on the bit rate and the number N of video frames. For example, if the bit rate is 4 Mbps, the number N of video frames per VOBU is 15, and a reproduction time per frame is 1/29.97 (NTSC system), the encoding amount per VOBU=4 Mbps*15*1/29.97=about 2 Mbits.

As understood from Expression 2, the larger the total segment number M, the smaller a ratio between the total segment number M and the reference segment number A (the reference segment number A/the total segment number M), that is, a ratio of the reference segment number A to the total segment number M. Hence, a capacity per VOBU increases, and the encoder circuit 3 can encode data at a higher bit rate. Accordingly, it is possible to support each reproduction time mode of a DVD recorder.

Here, a specific calculation example of Expression 2 is described. To give an example thereof, the total segment number M is 48, the reference segment number A is 2, and the stream buffer capacity is 4 megabytes. Regarding the compensated FWDI number K, in accordance with the DVD+VR standards, it is possible to respond to up to the forward pointer FWDI6, so the compensated FWDI number K is set to 6. Substituting these values gives (48−2)*(4/48)/6=about 0.63 MB on the left-hand side of Expression 2. Further, if the NTSC video frame number N per VOBU is 15, a system bit rate per VOBU is about 10.08 Mbps as the upper limit value of the DVD system rate. Accordingly, Expression 2 is stabilized, and the stream buffer having a size of about 4 Mbytes can smoothly record the data streams.

Incidentally, the reference segment number A is set to 2 in this example, but may be arbitrarily set, for example, to 1 or more as long as Expression 2 can be established. The number A may be adjusted in consideration of a delay in writing data to the disk.

Figure 3:
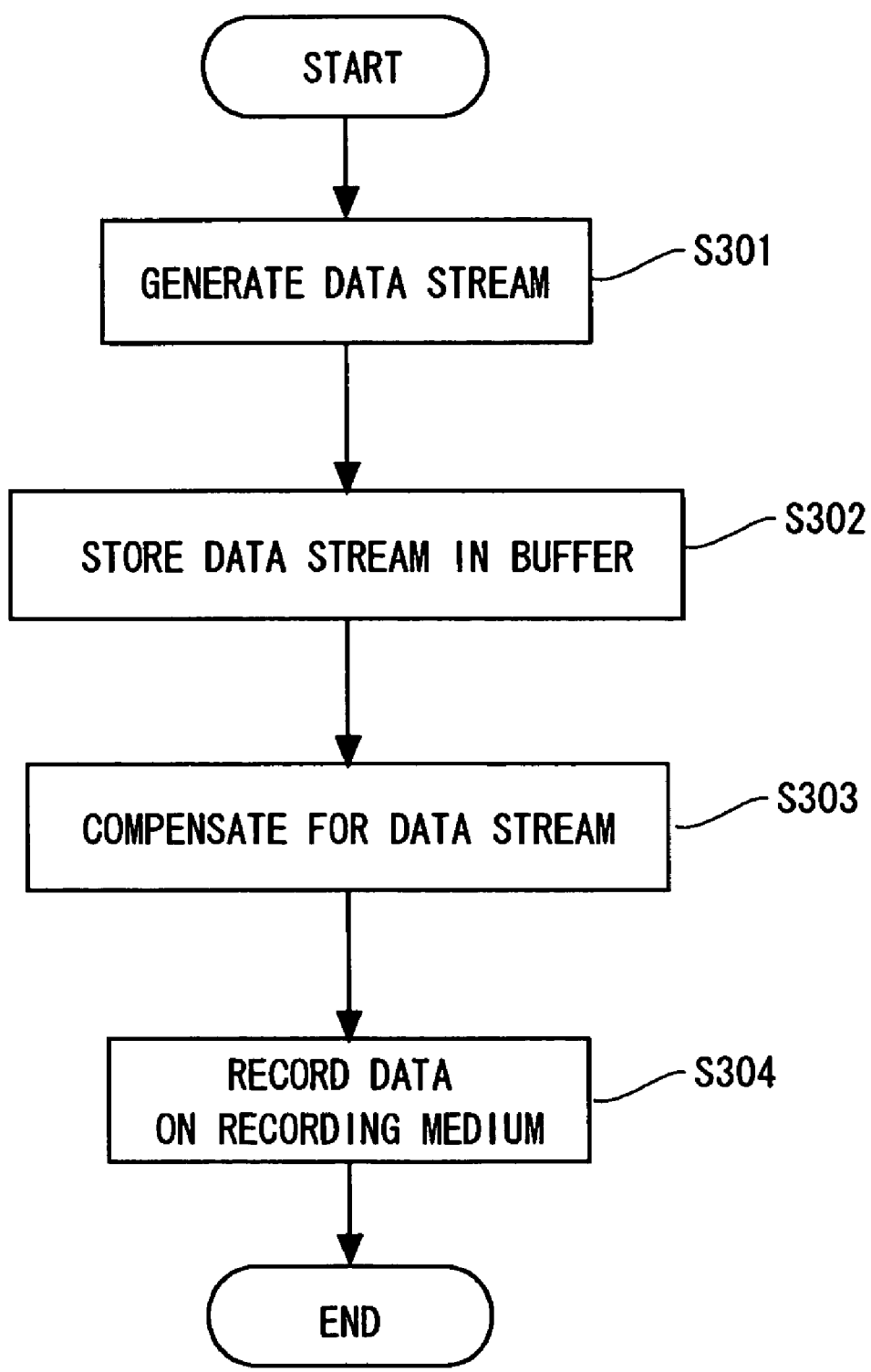
FIG. 3 is a flowchart showing an operation of the data recording apparatus according to the embodiment of the present invention.

Next, a data recording method using the data recording apparatus of this embodiment is described. A flowchart of FIG. 3 shows a processing for recording data on a recording medium with the data recording apparatus 1. This processing (S301 to S304) is a processing of writing input data to the recording medium 5 in the data format conforming to the DVD-Video standards in the data recording apparatus 1.

First, the encoder circuit 3 generates a data stream (S301) For example, the encoding unit 31 of the encoder circuit 3 compression-encodes signals supplied from the outside of the data recording apparatus 1, and VOBUs where the reproduction ending time VOB_V_E_PTM and the forward pointer FWDI have not been set are generated in sequence on real time. Then, the reproduction ending time setting unit 32 sets the reproduction ending time VOB_V_E_PTM for each generated VOBU, and outputs this to the stream buffer 4.

Next, the stream buffer 4 stores the generated data stream (S302). For example, the consecutive VOBUs generated in S301 are directly transferred from the encoder circuit 3 or by way of the system control circuit 2 to the stream buffer 4. Then, the stream buffer 4 stores the transferred VOBUs in the order of generation. At this time, the stream buffer 4 stores VOBUs in each segment in order, and after storing VOBU in the last segment, the storage of the VOBUs is started again from the head segment.

Next, the system control circuit 2 compensates for the data stream (S303). For example, the system control circuit 2 compensates for the forward pointer FWDI in NV_PCK of each VOBU stored in S302. As mentioned below, the system control circuit 2 compensates for the forward pointer FWDI based on the generation of the VOBU or detection of the full segment, and outputs the data stream of the segment to the storage interface circuit 6. At this time, the system control circuit 2 compensates for the forward pointer FWDI before the segment is reused and data is rewritten.

The system control circuit 2 references a storage completion notification issued each time the stream buffer stores the VOBU to generate a full segment signal each time the data stream is stored up to the end of the segment. When the number of generated full segment signals reaches a predetermined value, the stream buffer 4 outputs the VOBU of the segment including the first stored VOBU out of the segments, and stores the new data stream in that segment.

Next, the storage interface circuit 6 records a data stream to the recording medium 5 (S304). For example, the compensated data stream in S303 is transferred directly from the stream buffer 4 or by way of the system control circuit 2 to the storage interface circuit 6 on the segment basis. Then, the storage interface circuit 6 records a data stream transferred on the segment basis on the recording medium 5. At this time, in order to smoothly record data on the recording medium 5, it is preferable to set a speed for recording segment data to the recording medium 5 to be much higher than a speed for transferring segment data from the stream buffer 4.

Figure 4:
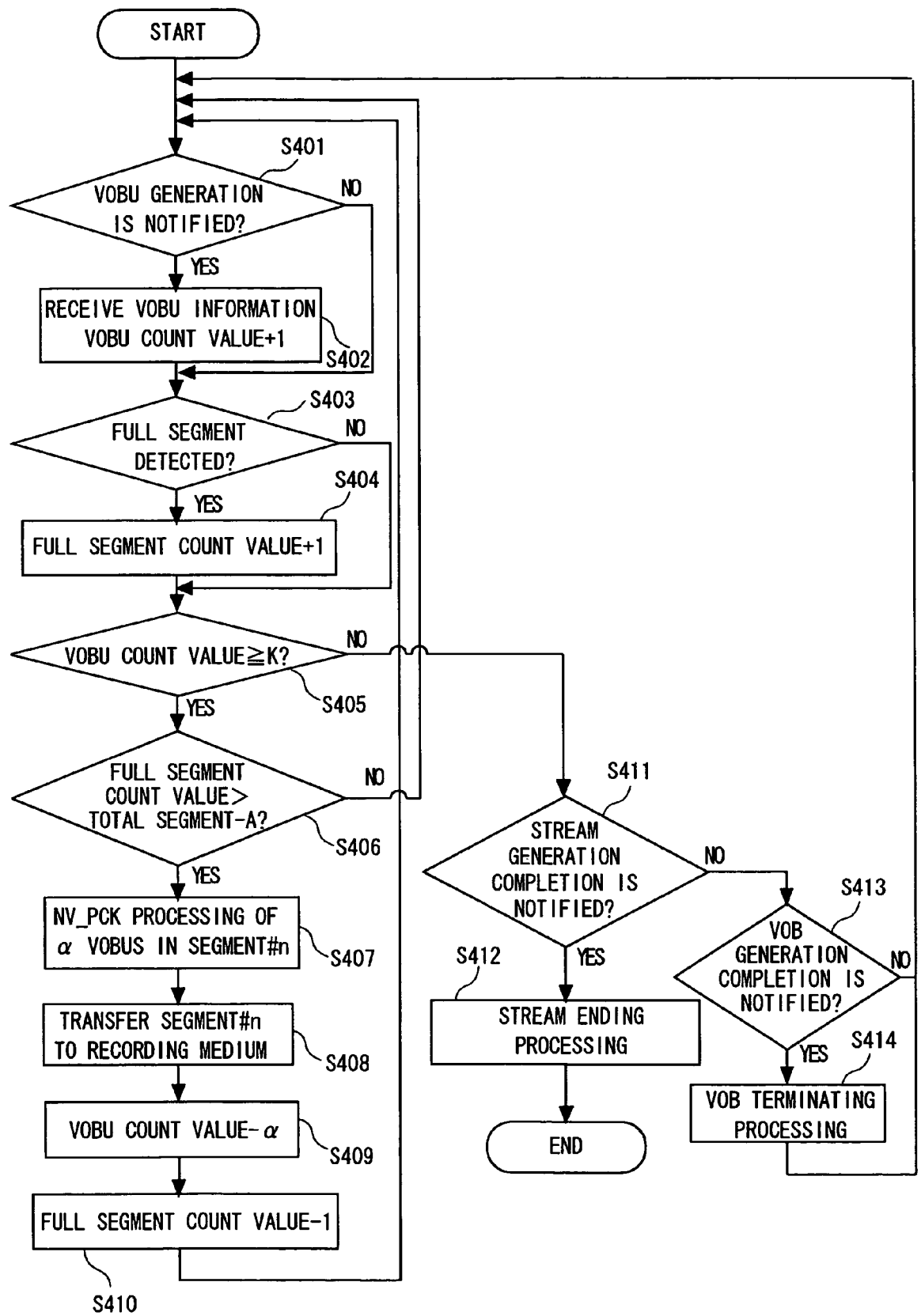
FIG. 4 is a flowchart showing an operation of the data recording apparatus according to the embodiment of the present invention.
Figure 7:
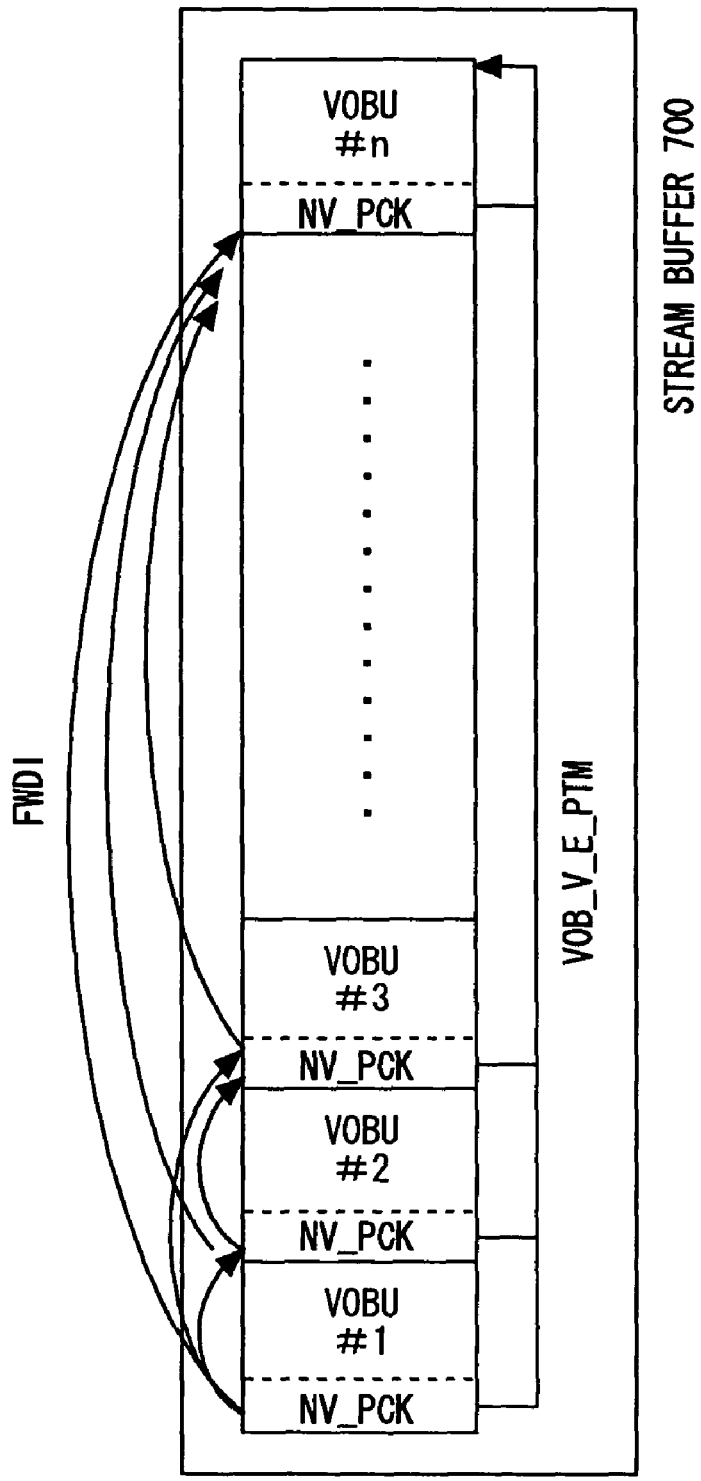
FIG. 7 shows the structure of a conventional stream buffer.

Referring next to a flowchart of FIG. 4, a compensating processing for the data stream in S303 of FIG. 3 is described in detail. As described above, this compensating processing for the data stream (S401 to S414) is executed in the system control circuit 2. For example, in parallel to the data stream generation or storage in S301 and S302, the system control circuit 2 monitors events such as generation of the VOBU, detection of the full segment, completion of the VOB generation, and completion of generation of the data stream, and executes the following processing based on the occurrence of the events. Incidentally, prior to the execution of the processing, each data is initialized, and the count values of VOBUs or full segments are reset.

First, the system control circuit 2 judges whether or not the VOBU generation is notified (S401). For example, the VOBU counter 21 monitors the notification of the VOBU generation from the encoder circuit 3, and the VOBU generation notification is received.

If it is judged that the VOBU generation notification is sent in S401, the system control circuit 2 receives the VOBU information, and adds 1 to the VOBU count value (S402). For example, when the VOBU counter 21 receives the VOBU generation notification from the encoder circuit 3, the counter further receives the number of packs of the VOBU as VOBU information. Then, the VOBU counter 21 increments the VOBU count value. The VOBU count value is, for example, the count value of all VOBUs in the stream buffer 4 or the count value of VOBUs in each segment.

If it is judged that the VOBU generation is not notified in S401, or after S402, the system control circuit 2 judges whether or not the full segment is detected (S403). For example, the segment detecting unit 23 monitors a storage state of each segment of the stream buffer 4 (storage capacity), and judges whether or not the data stream is throughout stored from the head to the end of each segment (whether or not the segment capacity is used to the full).

If it is judged in S403 that the full segment is detected, the system control circuit 2 adds 1 to the full segment count value (S404). For example, if the segment detecting unit 23 detects the full segment, the data setting unit 24 increments the count value of the full segments.

If it is judged in S403 that the full segment is not detected, or after S404, the system control circuit 2 judges whether or not the VOBU count value is not less than the compensated FWDI number K (S405). For example, the VOBU counter 21 references the VOBU count value to judge whether or not the count value is not less than the compensated FWDI number K in Expression 2 above, that is, whether or not the VOBUs necessary for each forward pointer of each navigation pack constituting a target VOBU is stored in the stream buffer 4.

If it is judged in S405 that the VOBU count value is not less than the compensated FWDI number K, the system control circuit 2 judges whether or not the full segment count value is larger than the (total segment number M–the reference segment number A) (S406). For example, the segment counter 22 references the full segment count value, and judges whether or not the count value is larger than the (total segment number M–the reference segment number A) in Expression 2 above, that is, whether or not the data stream is stored in up to the segment of (total segment number M–the reference segment number A). If it is judged in S406 that the full segment count value is not larger than (total segment number M–the reference segment number A), the system control circuit 2 executes a processing of S401 and subsequent processings again, and repeats the processing until the data stream is stored in up to the segment of (total segment number M–the reference segment number A). Incidentally, in the case of recording the data stream before the data stream reaches the segment of (total segment number M–the reference segment number A), the processing of S406 may be skipped.

If it is judged in S406 that the full segment count number is larger than (total segment number M–the reference segment number A), the system control circuit 2 executes α NV_PCK processings in the segment #n (S407). For example, the data setting unit 24 selects the segment (#n) to be output. The segment to be selected is the next segment subsequent to the previous segment. Then, the VOBU count value (α) of the selected segment is referenced to execute the NV_PCK processing on VOBUs as many as the count value. That is, in NV_PCK of each VOBU, the header address of a VOBU ahead of the current VOBU by the compensated FWDI number K is set for the forward pointer FWDI. The data setting unit 24 of the system control circuit 2 sets the K head addresses in the first stored VOBU after a data stream has been stored in a segment of a reference number (=total segment number M–the reference segment number A) smaller than the total segment number M.

Next, the system control circuit 2 transfers the segment #n to a recording medium (S408). For example, the segment data selected and compensated with the data setting unit 24 is transferred to the storage interface circuit 6.

Next, the system control circuit 2 subtracts a from the VOBU count value (S409). For example, the VOBU counter 21 subtracts the number of VOBUs of the output segment, that is, the number of VOBUs (α) processed in S407 from the total VOBU count value of the stream buffer 4, and resets the VOBU count value of the output segment.

Next, the system control circuit 2 subtracts 1 from the full segment count value (S410). For example, the segment counter 22 subtracts the number of output segments, that is, decrements the full segment counter value. After S410, the system control circuit 2 repeats the processing of S401 and subsequent processings to output the next segment.

On the other hand, if it is judged in S405 that the VOBU count value is smaller than the compensated FWDI number K, the system control circuit 2 judges whether or not the stream generation completion is notified (S411). For example, the data setting unit 24 monitors the stream generation notification from the encoder circuit 3, and judges whether or not the stream generation notification can be received.

If it is judged in S411 that the stream generation completion is notified, the system control circuit 2 executes a stream ending processing (S412). For example, the data setting unit 24 receives the stream generation notification, and then references the VOBU count value as the stream ending processing. If there are VOBUs to be output, the forward pointer FWDI is set for the NV_PCK of the remaining VOBUs, and the segment data including the VOBU is transferred to the storage interface circuit 6. After S412, the data stream compensating processing is completed.

Further, if it is judged in S411 that the stream generation completion is not notified, the system control circuit 2 judges whether or not the VOB generation completion is notified (S413). For example, the data setting unit 24 monitors the notification of the VOBU generation completion from the encoder circuit 3, and judges whether or not the VOBU generation completion notification is received.

If it is judged in S413 that the VOB generation completion is notified, the system control circuit 2 executes VOB termination processing (S414). For example, when receiving the VOB generation completion notification, the data setting unit 24 prevents the last VOBU in the VOB from being connected with the following VOBU via a pointer as the VOB termination processing. That is, a pointer of the next VOBU designated by the last VOBU (FWDI NEXT) is cleared.

If it is judged in S413 that the VOB generation completion is not notified, or after S414, the system control circuit 2 repeats the processing of S401 and subsequent processings again to output the next segment.

Referring now to a specific example of FIGS. 5A to 5E, a compensating processing for a data stream of FIG. 4 is described in more detail. FIGS. 5A to 5E show an example where VOBUs are sequentially stored in the segments #1 to

4 of the stream buffer 4, and the segment #1 is transferred to the recording medium 5. Herein, it is assumed that the reference segment number A is 2, the compensated FWDI number K is 6, and the total segment number M is 4 to establish Expression 2 above.

Referring first to FIG. 5A, VOBUs #1 to #3 are stored in the segment #1. When the encoder circuit 3 generates the VOBU, each time the VOBU is generated (in FIG. 5A, each time VOBU is stored in the stream buffer), the system control circuit 2 is notified of the VOBU generation. When receiving the VOB generation notification, the system control circuit 2 adds 1 to the VOBU count value (S401 and S402). Then, when the data stream is stored in up to the end of the segment #1 (in this example, when all of the VOBU#3 is stored), the system control circuit 2 detects the full segment, and adds 1 to the full segment count value (S403 and S404). At this time, the VOBU count value is 3, and the full segment count value is 1, so the system control circuit 2 judges that the VOBU count value is smaller than 6 (S405), that the stream generation completion is not notified (S411), and that the VOB generation completion is not notified (S413), and monitors the storage state of the stream buffer 4.

Next, as sown in FIG. 5B, VOBUs #4 to #6 and a part of VOBU#7 are stored in the segment #2. Similar to the above, the system control circuit 2 adds 1 to the VOBU count value each time the VOBU generation is notified (S401 and S402). Then, after the data stream is stored in the end of the segment #2 (in this example, after up to a part of the VOBU#7 is stored), the system control circuit 2 detects the full segment and adds 1 to the full segment count value 1 (S403 and S404). At this time, the VOBU count value is 6, and the full segment count value is 2, so the system control circuit 2 judges that the VOBU count value is 6 or more (S405), and that the full segment count value is 2 or less (S406), and then monitors the storage state of the stream buffer.

Next, as shown in FIG. 5C, VOBUs #7 to #9 and a part of VOBU#10 are stored in the segment #3. Similar to the above, the system control circuit 2 adds 1 to the VOBU count value each time the VOBU generation is notified (S401 and S402). Then, after the data stream is stored up to the end of the segment #3 (in this example, up to NV_PCK of the VOBU#10 is stored) the system control circuit 2 detects full segment and adds 1 to the full segment count value (S403 and S404). At this time, the VOBU count value is 9, and the full segment count value is 3, so the system control circuit 2 judges that the VOBU count value is 6 or more (S405), and that the full segment count value is 2 or more (S406), and then executes the processing of S407.

In S407, as shown in FIG. 5D, the system control circuit 2 executes NV_PCK processing. The system control circuit 2 executes the NV_PCK processing for three NV_PCKs in the segment #1. In this example, the forward pointer FWDIs #1 to #6 in each NV_PCK are set. Addresses of the VOBU#2 to #7 are set to the forward pointer FWDIs #1 to #6 of the VOBU#1, and addresses of the VOBU#3 to #8 are set for the forward pointer FWDIs #1 to #6 of the VOBU#2. Addresses of the VOBUs #4 to #9 are set for the forward pointer FWDIs #1 to #6 of the VOBU#3. At this time, VOBUs #10 and #11 and a part of VOBU#12 are stored in the segment #4. Then, the system control circuit 2 transfers the segment #1 to the storage interface circuit 6 and recorded on the recording medium (S408). Further, the system control circuit 2 subtracts 3 from the VOBU count value, and subtracts 1 from the full segment count value (S409 and S410).

After S408, as shown in FIG. 5E, data of the segment #1 has been transferred, and thus area of the segment #1 can be reused. Furthermore, the VOBUs are sequentially stored. In the segment #4, the VOBUs #12 and #13 are stored.

As mentioned above, according to this embodiment, the number VOBUs in the VOB is fixed, so the reproduction ending time VOB_V_E_PTM can be previously specified. Hence, it is unnecessary to store all of the data streams in one VOB in the stream buffer. Thus, the buffer capacity can be reduced to a size smaller than that of one VOB, and the memory can be saved.

Further, according to this embodiment, the stream buffer is divided into segments. VOBUs necessary for compensating for data on one VOBU are stored in one or more segments, so the buffer capacity can be set based on parameters such as a system bit rate. Accordingly, the buffer capacity can be minimized within a range where conditions of Expression 2 above can be met. For example, in contract to the conventional stream buffer capacity of about 17 megabytes, this embodiment ensures the capacity of 4 Mbytes, for example. Hence, the memory can be considerably saved. The memory size of this embodiment is about ⅕ of the conventional size; in the conventional case, 240 VOBUs are stored in the stream buffer. As a result, a system memory of the entire data recording apparatus such as a DVD recorder can be saved to further reduce a cost of a DVD recorder.

Other Embodiment

Incidentally, in the above example, the encoder circuit 3 sets the reproduction ending time VOB_V_E_PTM, but the present invention is not limited thereto. After the VOBU is stored in stream buffer 4, the system control circuit 2 may set the ending time. The reproduction ending time setting unit 32 may be provided in the system control circuit 2 to set the reproduction ending time VOB_V_E_PTM at the same timing as a setting timing of the forward pointer FWDI (S407). Further, in the case of DVD-Video standards, all the FWDIs in the VOB can be set. In this case, 1 cell in 1 VOB may be stored in the stream buffer.

Further, in the above example, the encoding bit rate is not adjusted, but the CBR (Constant Bit Rate) control or VBR (Variable Bit Rate) control may be further effected. Thus, the stream buffer capacity can be further reduced.

Further, in the above example, the data recording apparatus and method are described. However, the present invention is not limited to the data recording, but data reproduction may be carried out. For example, the storage interface circuit 6 of FIG. 1 may be used as a data reproducing apparatus conforming to the DVD-Video standards, and the data stream may be reproduced in S304 of FIG. 3.

It is apparent that the present invention is not limited to the above embodiment that may be modified and changed without departing from the scope and spirit of the invention.

What is claimed is:

1. A data recording/reproducing apparatus, comprising:
   a temporary storage unit for storing a data stream including a plurality of data units, which is divided into M (M is a natural number) segments that stores the plurality of data units;
   a control unit for detecting that K (K is a natural number) data units related to the order of reproducing or recording data of a first data unit, after the first data unit included in the data stream is stored in the temporary storage unit, and setting relational information for the K data units in the first data unit; and
   a recording/reproducing unit that receives the data stream including the set first data unit from the temporary storage unit on a segment basis, and references the received data stream to generate recording data to record the data on a recording medium, and/or reads the recorded data from the recording medium to reproduce the read data
wherein a storage capacity of the temporary storage unit is set to satisfy the following expression if a reference number is a natural number smaller than M:

a reference number*(the storage capacity of the temporary storage unit/$M$)/$K \geqq$ encoding amount per data unit.

2. The data recording/reproducing apparatus according to claim 1, wherein the temporary storage unit stores the data stream from the first segment to the Mth segment in order, and then outputs the data stream stored in the first segment to update the data stream stored in the first segment to a new data stream which is input newly to the first segment, and subsequently updates the segments where the data stream is output to new data streams.

3. The data recording/reproducing apparatus according to claim 1, wherein the control unit includes a data unit detecting unit for updating a count value each time the data unit is stored in the temporary storage unit, and detecting the number of stored data units based on the count value.

4. The data recording/reproducing apparatus according to claim 1, wherein the control unit references a storage completion notification generated each time the data unit is stored in the temporary storage unit to generate a full segment signal each time the data stream is stored up to the end of the segment, and
the temporary storage unit outputs the data unit of the segment including the first stored data unit out of the segments when the number of generated full segment signals reaches a predetermined value to store the new data stream in the output segment.

5. The data recording/reproducing apparatus according to claim 1, wherein the control unit sets the K relational information in the first data unit when the data stream is stored in the K data units.

6. The data recording/reproducing apparatus according to claim 1, wherein the control unit includes:
a segment detecting unit for detecting that the data stream is stored up to the end of the segment;
a segment counter for counting the number of segments detected by the segment detecting unit; and
a data setting unit for setting the K relational information when the count value of the segment counter reaches a number smaller than M, and the data stream is stored in the K data units.

7. The data recording/reproducing apparatus according to claim 1, wherein the recording/reproducing unit records or reproduces the output data stream on the segment basis.

8. The data recording/reproducing apparatus according to claim 1, wherein a data structure of the data stream is a hierarchical structure including a plurality of layers, and
an upper-layer data block composed of the data units includes a predetermined number of the data units.

9. The data recording/reproducing apparatus according to claim 8, wherein end data related to the data unit arranged at the end of the upper-layer data block are previously set for each of the data units in the upper-layer data block before storage of the data unit arranged at the end.

10. The data recording/reproducing apparatus according to claim 9, wherein the end data is a recording or reproduction ending time for the data unit arranged at the end of the upper-layer data block.

11. A data recording/reproducing method for recording or reproducing a data stream to be input, comprising:
storing a data stream including a plurality of data units to a temporary storage unit that is divided into M (M is a natural number) segments that stores the plurality of data units;
detecting that K (K is a natural number) data units related to the order of reproducing or recording data of a first data unit, after the first data unit included in the data stream is stored in the temporary storage unit;
setting relational information for the K data units in the first data unit; and
receiving the data stream including the set first data unit from the temporary storage unit on a segment basis, and referencing the received data stream to generate recording data to record the data on a recording medium, and/or reading the recorded data from the recording medium to reproduce the read data
providing a storage capacity of the temporary storage unit to be set to satisfy the following expression if a reference number is a natural number smaller than M:

a reference number*(the storage capacity of the temporary storage unit/$M$)/$K \geqq$ encoding amount per data unit.

12. The data recording/reproducing method according to claim 11, wherein the storing of the data stream includes storing the data stream from the first segment to the Mth segment in order, and then outputting the data stream stored in the first segment and updates the data stream stored in the first segment to a new data stream which is input newly to the first segment and subsequently updates the segments where the data stream is output to new data streams.

13. The data recording/reproducing method according to claim 11, wherein the detecting of the K data units includes referencing a storage completion notification generated each time the data unit is stored in the temporary storage unit to generate a full segment signal each time the data stream is stored up to the end of the segment, and
the storing of the data stream includes outputting the data unit of the segment including the first stored data unit out of the segments when the number of generated full segment signals reaches a predetermined value to store the new data stream in the output segment.

14. The data recording/reproducing method according to claim 11, wherein the setting of the relational information includes setting the K relational information in the first data unit when the data stream is stored in the K data units.

* * * * *